United States Patent [19]

Wellner et al.

[11] Patent Number: 4,602,071

[45] Date of Patent: Jul. 22, 1986

[54] PROCESS FOR THE PRODUCTION OF OLIGOURETHANES CONTAINING MERCAPTO GROUPS AND THEIR USE AS BINDERS FOR COATING AND SEALING COMPOSITIONS HARDENABLE BY OXIDATION AND AS ADDITIVES FOR EPOXIDE RESINS

[75] Inventors: Wolfgang Wellner; Josef Pedain, both of Cologne; Hermann Gruber, Leverkusen, all of Fed. Rep. of Germany

[73] Assignee: Bayer Aktiengesellschaft, Leverkusen, Fed. Rep. of Germany

[21] Appl. No.: 379,802

[22] Filed: May 19, 1982

[30] Foreign Application Priority Data

May 29, 1981 [DE] Fed. Rep. of Germany ....... 3121384

[51] Int. Cl.$^4$ .................... C08G 59/02; C08L 63/00; C08L 75/08
[52] U.S. Cl. ...................................... 525/528; 528/65
[58] Field of Search .......................... 525/528; 528/65

[56] References Cited

U.S. PATENT DOCUMENTS

| | | | |
|---|---|---|---|
| 3,352,830 | 11/1967 | Schmitt et al. | 528/65 |
| 3,446,780 | 5/1969 | Bertozzi | 260/75 |
| 4,110,295 | 8/1978 | Wilhelm et al. | 260/30.4 R |
| 4,113,707 | 9/1978 | Louthan et al. | 528/279 |

*Primary Examiner*—John C. Bleutge
*Assistant Examiner*—Robert E. L. Sellers, II
*Attorney, Agent, or Firm*—Gene Harsh; Joseph C. Gil; Thomas W. Roy

[57] ABSTRACT

The invention relates to a process for the production of oligourethanes containing terminal mercapto groups by reacting 1-isocyanatomethyl-1,3,3-trimethyl-5-isocyanatocyclohexane with substoichiometric quantities of relatively high molecular weight polyether polyols and mercapto ethanol and to the use of the oligourethanes obtainable in this way as binders for coating and sealing compositions hardenable by oxidation and as additives for epoxide resins.

5 Claims, No Drawings

PROCESS FOR THE PRODUCTION OF OLIGOURETHANES CONTAINING MERCAPTO GROUPS AND THEIR USE AS BINDERS FOR COATING AND SEALING COMPOSITIONS HARDENABLE BY OXIDATION AND AS ADDITIVES FOR EPOXIDE RESINS

BACKGROUND OF THE INVENTION

1. Field of the Invention

This invention relates to a new process for the production of oligourethanes containing mercapto groups from selected starting materials and to the use of the products obtained by this process as binders for coating and sealing compositions hardenable by oxidation and as additives for epoxide resins.

2. Description of the Prior Art

Oligomers and polymers which contain SH-groups and which may therefore be hardened by oxidation with oxidizing agents, such as $MnO_2$, $PbO_2$, chromates or organic peroxides, or even by air in the presence of certain catalysts to form rubber like elastic plastics have already been repeatedly described. The use of binders of this type for the production of sealing and coating compositions is also known (cf German Offenlegungsschrift Nos. 2,739,117 and 2,557,088 and German Auslegeschrift No. 2,363,856).

The main advantage of binders such as these over other types of binder (such as for example oligourethanes containing terminal NCO groups) lies inter alia in the fact that they harden and form bubble-free polymers even in the presence of water which may reach them through moist pigments or additives or from the atmosphere.

On the other hand, oligourethanes containing free NCO groups which are used as binders for sealing and coating compositions have several advantages to compensate for the disadvantage of bubble formation where hardening is carried out with water (i.e. atmospheric moisture). They are suitable for example for the production of highly weather-resistant compositions characterized by high permanent elasticity, extreme toughness, high abrasion resistance and resistance to solvents and other chemical influences.

Accordingly, there has been no shortage of attempts to link the valuable properties of the polyurethanes with the hardening mechanism through mercapto groups. Oligourethanes containing terminal mercapto groups are described in particular in German Offenlegungsschrift No. 1,770,259. They are produced by initially reacting a polyol with excess diisocyanate to form a prepolymer containing NCO-groups and then urethanizing the prepolymer thus formed with an alcohol containing an HS-group. The process according to German Offenlegungsschrift No. 1,770,259 gives oligourethanes containing terminal mercaptan groups which harden through oxidation without any bubbles and without foaming, even in the presence of moisture.

However, the products obtained by the process according to German Offenlegungsschrift No. 1,770,259 have disadvantages which make them difficult or impossible to use for high quality sealing or coating compositions. Above all, the products are highly susceptible to yellowing because aromatic diisocyanates are predominantly used in their production. The known yellowing of these isocyanates has a very unfavorable, quality-reducing effect in the case of coating compositions containing white or light pigments. Although aliphatic diisocyanates are also mentioned as suitable and an aliphatic diisocyanate is used in one Example, these starting products (as will also be shown hereinafter in comparative tests) do not in any way lead to optimally suitable sealing and coating compositions. One of the major disadvantages of using the aliphatic diisocyanates accordinq to German Offenlegungsschrift No. 1 770 259 is the high surface tackiness of the fully reacted compositions. Precisely the same statement can be made in view of the teaching of U.S. Pat. No. 3 446 780. The authors of this reference as well as the inventors of above Offenlegungsschrift did not find a suitable way to sealing and coating compositions which are lightfast and whioh lead to fully reacted compositions which are free from surface tackiness. In addition, the authors of German Offenlegungsschrift No. 1,770,259 failed to recognize that mercapto ethanol in particular has significant advantages as a reactant for the isocyanate prepolymer and, under certain conditions, leads to particularly suitable products. Instead, it is alleged that the use of mercapto ethanol leads to substances which have only a minimal resistance to alkalis and heat (German Offenlegungsschrift No. 1,770,259, page 16).

It has now surprisingly been found that, by using selected starting materials, particularly 1-isocyanatomethyl-1,3,3-trimethyl-5-isocyanatocyclohexane (isophorone diisocyanate, IPDI) as the diisocyanate in conjunction with certain polyether polyols described in detail hereinafter and particularly in conjunction with 2-mercapto ethanol, it is possible to produce particularly valuable oligourethanes containing mercapto groups which may be used in particular in the production of light-stable coating and sealing compositions characterized by excellent stability to alkalis and heat.

SUMMARY OF THE INVENTION

The present invention relates to a process for the production of oligourethanes containing terminal mercapto groups by reacting
  (a) diisocyanates with
  (b) substoichiometric quantities of polyether polyols
  (c) and from about 0.8 to 1.1 times the equivalent quantity of a mercapto alkanol, based on the excess of isocyanate groups arising out of the molar ratio between components (a) and (b) and the hydroxyl groups of component (c), characterized in that
    (a) the diisocyanate used is 1-isocyanatomethyl-1,3, 3-trimethyl-5-isocyanatocyclohexane,
    (b) the polyether polyol used is a polyether polyol having a theoretical molecular weight of at least about 2000 and an (average) OH-functionality of greater than about 2.5 and
    (c) the mercapto alkanol used is mercapto ethanol.

The present invention also relates to the use of the products obtained by the process according to the invention as binders hardenable by oxidation for coating and sealing compositions and as additives for epoxide resins.

DETAILED DESCRIPTION OF THE INVENTION

In the process according to the invention isophorone diisocyanate is used as component (a), i.e. as the diisocyanate.

Component (b), i.e. the polyether polyol, is a polyether polyol or a mixture of polyether polyols having an (average) OH-functionality of at least about 2.5, preferably from about 2.9 to 4.0, and an (average) molecular weight calculable from the functionality and the hydroxyl content of at least about 2000 and preferably from about 4000 to 7000. The polyether polyols or polyether polyol mixtures are produced in known manner by alkoxylating suitable starter molecules, particularly using propylene oxide and optionally up to about 50 mole percent, based on the total quantity of alkylene oxide, of ethylene oxide. Suitable starter molecules, which are selected and combined taking into consideration the foregoing observations in regard to OH-functionality, are for example water, ethylene glycol, 1,2- and 1,3-propane diol, 1,2- and 1,4-butane diol, 1,6-hexane diol, trimethylol propane, hexane triol, glycerol, triethanolamine, sorbitol, mannitol, sucrose, ammonia, ethylene diamine and hexamethylene diamine. Polyether polyols containing tertiary nitrogen which have been produced using nitrogen-containing starter molecules are not as preferred as the nitrogen-free polyether polyols. Instead of using mixtures of starter molecules in the production of the polyether polyols, it is even possible to mix polyether polyols produced in advance so that the mixtures comply with the above-mentioned requirements in regard to average OH-functionality and average molecular weight.

In the process according to the invention 2-mercapto ethanol is used as component (c), i.e. as the mercapto alkanol.

In the practical application of the process according to the invention, the reactants are used in quantitative ratios corresponding to an NCO/OH-equivalent ratio, based on components (a) and, (b), of from about 1.8:1 to 3:1 and preferably from about 1.8:1 to 2.2:1. Component (c) is used in about 0.8 to 1.1 times the equivalent quantity and preferably in approximately the equivalent quantity, based on the NCO-excess arising out of the quantitative ratios between components (a) and (b) on the one hand and the hydroxyl groups in component (c) on the other hand.

To carry out the process according to the invention, components, (b) and, (c) may be premixed and reacted in known manner with component (a). In one preferred embodiment of the process according to the invention, however, an NCO-prepolymer is initially prepared in known manner from components (a) and (b) and is reacted with component (c) in a second reaction stage.

Both variants of the process according to the invention are carried out at a reaction temperature in the range from about 50 to 150° C. and preferably at a reaction temperature in the range from about 90 to 130° C. The reactions according to the invention are preferably carried out in an inert gas atmosphere, for example in a nitrogen atmosphere.

In principle it is also possible to modify the preferred variant of the process according to the invention to the extent that component (b) is reacted with a very large excess of component (a) in a first reaction stage, after which the excess diisocyanate is removed by distillation before the reaction product thus obtained is reacted with component (c). A procedure such as this would result in an NCO/OH-equivalent ratio of 2:1 in respect of the reaction taking place between (a) and (b).

The reaction according to the invention may be carried out in the presence of suitable inert solvents. However, the reaction is preferably carried out in the absence of solvents. Although the catalysts known per se which accelerate the isocyanate addition reaction may also be used, they are generally unnecessary.

The products obtained by the process according to the invention are oligourethanes containing terminal mercapto groups and having an average molecular weight calculable from the type of and quantitative ratios between the starting materials of from about about 2000 to 10,000 and preferably from about about 4000 to 8000. The SH-functionality of the products obtained by the process according to the invention corresponds to the average OH-functionality of component (b). The products obtained by the process according to the invention are generally liquids which are viscous at room temperature or substances which, although no longer fluid at room temperature, may readily be combined with suitable plasticizer oils to form mixtures which are fluid at room temperature. Plasticizer oils suitable for this purpose are for example the phthalates normally used, such as for example dibutyl phthalate, dioctyl phthalate, diisodecyl phthalate, dibenzyl phthalate or butyl benzyl phthalate.

The products obtained by the process according to the invention have several advantageous properties. As already mentioned, they may be produced with relatively low viscosities and are readily soluble in standard plasticizers. In combination with suitable oxidizing agents, such as lead dioxide or manganese dioxide, they harden to form bubble-free high molecular weight plastics which are distinguished from the corresponding prior-art plastics by a dry, non-tacky surface characterized by high color stability and which, in addition, show excellent resistance to alkalis and heat. The same favorable range of properties is obtained when the products obtained by the process according to the invention are hardened by oxidation with air in the presence of known catalysts. Catalysts suitable for this purpose are, for example, the systems described in U.S. Patent Nos. 3,991,039 and 4,224,200. However, particularly suitable catalysts are combinations of (i) dibenzothiazyldisulfide corresponding to the following formula

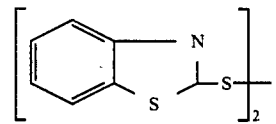

with (ii) carboxylates or enolates of manganese, iron, cobalt or nickel which are soluble in the products obtained by the process according to the invention and (iii) certain organic bases.

Suitable carboxylates or enolates (ii) are, for example the salts of the above-mentioned metals with aliphatic, cycloaliphatic or aromatic monocarboxylic or dicarboxylic acids, such as for example the corresponding hexanoates, octoates, laurates, palmitates, stearates, benzoates, phthalates or naphthanates or enolates of the above-mentioned metals, such as for example the corresponding acetyl acetonates.

Suitable organic bases (iii) are, for example, guanidine and, in particular, substituted guanidines derived from guanidine by substitution of the primary amino groups by $C_1$-$C_4$-alkyl radicals or by phenyl radicals, such as for example N,N'-dimethyl guanidine, N,N'-dibutyl guanidine or N,N'-diphenyl guanidine, and tertiary amines having a molecular weight in the range from 79 to 300, such as pyridine, N,N-dimethyl aniline, triethylene diamine or hexamethylene tetramine (1,3,5,7-tetraazatricyclo[3.3.1.1$^{3,7}$]-decane). In the particularly preferred catalyst systems, the components are present in such quantitative ratios that there are from about 0.02 to 0.5 part by weight of component (ii) and from about 0.05 to 1.0 part by weight of component (iii) per part by weight of component (i). It is of course also possible to use mixtures of the individual components.

Where the products obtained by the process according to the invention are used in accordance with the invention as binders for air-hardening coating and sealing compositions using the particularly preferred catalyst systems just mentioned, the individual components (i), (ii) and (iii) may be added to the binder either separately or in premixed form. When either the particularly preferred catalyst systems are used or when the catalysts according to the prior art cited above are used, the catalysts are generally added in a quantity of from about 0.01 to 5% by weight and preferably in a quantity of from about 0.5 to 1.5% by weight, based on the total weight of the catalysts on the one hand and the weight of the binder on the other hand.

For producing coating or sealing compositions ready for use, the products obtained by the process according to the invention may contain—in addition to the components already mentioned—other auxiliaries and additives such as, for example, plasticizers of the type mentioned by way of example above, diluents, solvents, fillers, pigments, thickeners, antiagers and special additives for producing certain properties, such as for example silanes for improving the adhesion properties. For flame-proof finishing, it is possible to use fire-retarding additives such as, for example aluminum oxide hydrate, antimony trioxide or halogen-containing additives, such as for example PVC powder. To increase the electrical conductivity of the compositions, it is possible to incorporate graphite or metal powders for example. Rubber in powder or granular form may also be added to reduce costs and to improve resistance to abrasion. Emulsification aids may also be used for dispersion in water.

The products obtained by the process according to the invention are suitable for use as binders for sealing compositions of all kinds of the type commonly used for sealing and bonding inter alia in building construction, in motor vehicle manufacture, in ship building and in aircraft construction or in the production of panels of insulating glass. The products obtained by the process according to the invention are also suitable for the production of cast resins, for example for the production of molding compositions and for cable sealing compounds in the electrical field. The products obtained by the process according to the invention are also very suitable for use as binders for coating compositions, particularly for the production of thick coatings, for example for sealing concrete buildings, for coating roofs or for wear-resistant coatings in motor vehicle manufacture and ship building.

As already mentioned, the products obtained by the process according to the invention are oxidation-hardening binders for the above-mentioned applications which may be processed as one-component compositions (hardening under the influence of air). However, the products obtained by the process according to the invention may also be processed in the form of two-component compositions, in which case the second component may be formed for example by oxidizing agents of the type known per se and mentioned by way of example above or epoxide resins, i.e. polyepoxides containing at least 2 epoxide groups. Accordingly, the products obtained by the process according to the invention are also valuable additives, i.e. in particular as elasticizing hardeners for epoxide resins of the type in question. The systems which may be processed as two-component compositions are suitable for virtually any of the applications mentioned by way of example in the foregoing.

Finally, the products obtained by the process according to the invention may also be used for modifying polybutadiene resins.

The invention is further illustrated by the following Examples.

EXAMPLE 1

(According to the invention)

666 g of IPDI are added to 6000 g of a polyether polyol (average molecular weight 6000) which has been obtained by the alkoxylation of trimethylol propane with an alkoxylating agent containing 78 mole percent propylene oxide and 22 mole percent ethylene oxide, followed by reaction at around 100° C. under nitrogen as inert gas to form an NCO prepolymer having an NCO content of 1.8%. 222.6 g of mercapto ethanol are then added, followed by stirring at around 100° C. until no more NCO groups can be detected in the IR-spectrum. A clear substantially colorless liquid having a viscosity of 110 Pas at 23° C. is obtained. The product flows freely and does not contain any gel particles. For further processing, it is dissolved in butyl benzyl phthalate to form an 85% solution.

EXAMPLE 2

(Comparison)

The procedure is as in Example 1, except that the IPDI is replaced by 786 g of 4,4'-diisocyanatodicyclohexyl methane. The product obtained is no longer fluid at room temperature and, although fluid at elevated temperature, contains numerous gel particles. Neither can it be homogeneously diluted with standard commercial plasticizers. Because of this, it cannot be processed to form sealing compositions. (With regard to the hardness of a plastic hardened by oxidation using this product, see Example 5).

EXAMPLE 3

(Comparison)

The procedure is as in Example 1, except that the IPDI is replaced by 504 g of hexamethylene diisocyanate. A liquid of very high viscosity is obtained and, although containing gel particles, may be diluted with standard plasticizers and converted into a form in which it may be processed (cf. Example 8 below).

EXAMPLE 4

(Comparison)

The procedure is as in Example 1, except that the IPDI is replaced by 522 g of tolylene diisocyanate (2,4and 2,6-isomer in a ratio of 80:20). A liquid of very high viscosity is obtained which, although no longer fluid at 23° C., may be diluted with dibutyl phthalate and processed to form sealing compositions (cf Example 9 below).

EXAMPLE 5

(Hardening with oxidizing agents)

The additives mentioned below are added in the quantities indicated to the products of Examples 1 and 2. Approximately 10 mm thick coatings in polyethylene molds are prepared from the compositions thus produced. Hardness is determined after the moldings have been stored for 48 hours at 23° C. The pot life of the mixtures ready for use is also quoted:

| Composition | A | B | C | D |
|---|---|---|---|---|
| Product of Example 1 | 100 g | 100 g | — | — |
| Product of Example 2 | — | — | 100 g | 100 g |
| Lead dioxide | 10 g | — | 10 g | — |
| Manganese dioxide | — | 12 g | — | 12 g |
| Butyl benzyl phthalate | 10 g | 12 g | 10 g | 12 g |
| Water | — | 5 g | — | 5 g |
| Pot life in hours | 3 | 1 | 1 | 1 |
| Shore-A-hardness of the hardened product | 50 | 40 | 10 | cannot be measured |

EXAMPLE 6

(Air hardening)

The procedure is as in Example 5, except that hardening by oxidation is effected solely by the action of air through the absence of oxidizing agents. The test specimens are stored in air at 23° C.

| Composition | Example 6a | 6b | 6c | 6d |
|---|---|---|---|---|
| Product of Example 1 | 100 | 100 | 100 | 100 |
| Manganese octoate (6% Mn) | 2 | 2 | 2 | 2 |
| Dibutyl dithiocarbamate zinc salt | 1 | — | — | — |
| Tetramethyl thiuram disulfide | — | 1 | — | — |
| Dibenzothiazyl disulfide | — | — | 1 | — |
| Dibenzothiazyl disulfide in combination with diphenyl guanidine and hexamethylene tetramine (ratio by weight 70:15:15) | — | — | — | 1 |
| Skin forming time in air at 23° C. in minutes | 15 | 20 | 90 | 10 |

EXAMPLE 7

(Production of a sealing composition for processing as a one-component system)

The following components are mixed to form a sealing composition:

| | |
|---|---|
| Product of Example 1 | 100 parts by weight |
| Diisodocyl phthalate | 100 parts by weight |
| Chalk powder (specific surface 80 m²/g) | 300 parts by weight |
| Titanium dioxide | 20 parts by weight |
| Manganese octoate (Mn—content 6%) | 1 part by weight |
| Catalyst according to Example 6d | 1 part by weight |
| | 522 parts by weight |

The above-mentioned paste-like mixture may be stored for at least 6 months and hardens on contact with air to form an elastic material having a Shore hardness of approximately 20. The sealing composition thus obtained is distinguished by its dry surface.

EXAMPLE 8

(Comparison of the products according to Examples 1 and 3)

The sealing composition according to Example 7 is compared in the following with a similar sealing composition produced using the products based on hexa-methylene diisocyanate described in Example 3. Layers approximately 2mm thick are applied by knife coating to glass plates and dried in air at 23° C. The degree of drying is determined in accordance with DIN 53 150.

| Sealing composition based on | Degree of drying according to DIN 53 150 |
|---|---|
| Product of Example 1 | 6 |
| Product of Example 3 | 2 |

EXAMPLE 9

(Comparison of Examples 1 and 4)

The sealing composition according to Example 7 is compared in the following with a similar sealing composition produced using the product of Example 4 instead of the product of Example 1. The test specimens produced as described in Example 8 are subjected to a UV test. The test specimens are first exposed to UV light for 200 hours in accordance with DIN 53 389. The test specimens are then assessed for yellowing in accordance with DIN 53 230. This assessment is based on an evaluation scale extending from 1 (unchanged) to 5 (serious yellowing).

| Sealing composition based on | Initial value | Final value after 200 hours |
|---|---|---|
| Product of Example 1 | 1 | 1 |
| Product of Example 4 | 1 | 3.6 |

EXAMPLE 10

(Use as an additive for epoxide resins)

The product according to Example 1 is mixed with the quantities indicated in the following table of an epoxide corresponding to the following formula

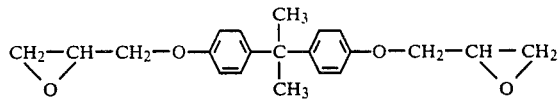

and with the catalyst indicated. Moldings having a layer thickness of 10 mm are produced from the mixture thus obtained in polyethylene molds. The test specimens are then stored for 24 hours at 50° C., after which their Shore-A-hardness is determined.

| Composition | Example 10a | 10b | 10c | 10d |
|---|---|---|---|---|
| Product of Example 1 | 100 | 100 | 100 | 100 |
| Epoxide resin | 30 | 24 | 18 | 12 |
| Tris-dimethylaminomethyl phenol (catalyst) | 5 | 5 | 5 | 5 |
| Shore-A-hardness (after 24 hours at 50° C.) | 51 | 47 | 43 | 16 |

EXAMPLE 11

(Production of a sealing composition suitable for use as a binder for the production of insulating glass panels)

The following components are mixed to form a sealing composition:

| | |
|---|---|
| Product of Example 1 | 150 |
| Diisodecyl phthalate | 150 |
| 2,2'-methylene-bis-(4-methyl-6-tert.-butylphenol) | 4 |

| -continued | |
| --- | --- |
| as anti-oxydant agent | |
| Titanium dioxide | 10 |
| Chalk powder (specific surface 80 m²/g) | 250 |
| γ-glycidyloxypropyl trimethoxy silane as coupling agent | 0.5 |
| Lead dioxide | 15 |
| Water | 1.5 |

With a processing time of approximately 1 hour, the composition hardens to form a sealing composition having a Shore-A-hardness of 30. The sealing composition shows very good adhesion to glass and eloxalated aluminum of the type used for insulation purposes.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of oligourethanes containing terminal mercapto groups which comprises reacting
   (a) 1-isocyanatomethyl-1,3,3-trimethyl-5-isocyanatocyclohexane with
   (b) substoichiometric quantities of a polyether polyol having a theoretical molecular weight of about 4000 to 7000 and an average OH-functionality of greater than about 2.5 and
   (c) about 0.8 to 1.1 times the equivalent quantity of mercapto ethanol, based on the excess of isocyanate groups arising out of the molar ratio of components (a) to (b) and the hydroxyl groups of component (c).

2. The process of claim 1, wherein an NCO-prepolymer is initially prepared from components (a) and (b) at an NCO/OH-equivalent ratio of from about 1.8:1 to 3:1 and is then reacted with component (c).

3. The product of claim 1 or 2.

4. A coating or sealing composition which is hardenable by oxidation and contains as binder the product of claim 3.

5. A composition comprising
   (a) epoxide resins and
   (b) the product of claim 3.

* * * * *